United States Patent [19]
Chesnut

[11] 3,860,091
[45] Jan. 14, 1975

[54] APPARATUS AND METHODS FOR MERCHANDISE TALLYING AND AUTOMATIC BAGGING

[76] Inventor: William R. Chesnut, 37 Laurel Pl., West Caldwell, N.J. 07006

[22] Filed: Dec. 3, 1973

[21] Appl. No.: 421,338

Related U.S. Application Data
[63] Continuation of Ser. No. 339,780, March 12, 1973.

[52] U.S. Cl.......................... 186/1 A, 53/35, 53/390
[51] Int. Cl............................................. B65b 67/04
[58] Field of Search............ 186/1 A, 1 AC; 53/390, 53/391, 35

[56] References Cited
UNITED STATES PATENTS

| | | | |
|---|---|---|---|
| 3,546,829 | 12/1970 | Lonergan | 53/390 |
| 3,579,959 | 5/1971 | Bossetta | 53/391 |
| 3,628,632 | 12/1971 | Lambert | 186/1 A |
| 3,699,741 | 10/1972 | Norman | 53/390 |
| 3,774,370 | 11/1973 | Fried | 53/391 |

Primary Examiner—Richard A. Schacher
Assistant Examiner—Jeffrey V. Nase
Attorney, Agent, or Firm—Bain, Gilfillan & Rhodes

[57] ABSTRACT

Apparatus and methods for automatic merchandise tallying and bagging including an automatic merchandise tally and bagging apparatus comprising means for conveying merchandise to a tallying station, a transportable cassette loading station contiguous to the tallying station, the cassette adapted to receive merchandise stacked according to density, conveyor means extending from the cassette loading station to a bag loading station, the cassette loading station and conveyor means extending from there to the bag loading station being inclined from the vertical, a reciprocating bag loading assembly adapted to receive cassettes from the cassette conveyor means, means for feeding an opened bag immediately beneath the bag loading assembly, means for reciprocating the bag loading assembly and cassette positioned therewithin into the opened bag positioned therebeneath retractable support means on the bag loading assembly beneath the cassette, said means supporting merchandise therein as the bag loading assembly descends into the bag means for retracting the said support from beneath the merchandise proximal to the bottom of the bag, means for reciprocating the bag loading assembly together with the empty cassette thereafter upwardly from within the bag to its top-most position and cassette recirculating means operatively connected to and communicating between the bag loading assembly and the cassette loading station.

21 Claims, 21 Drawing Figures

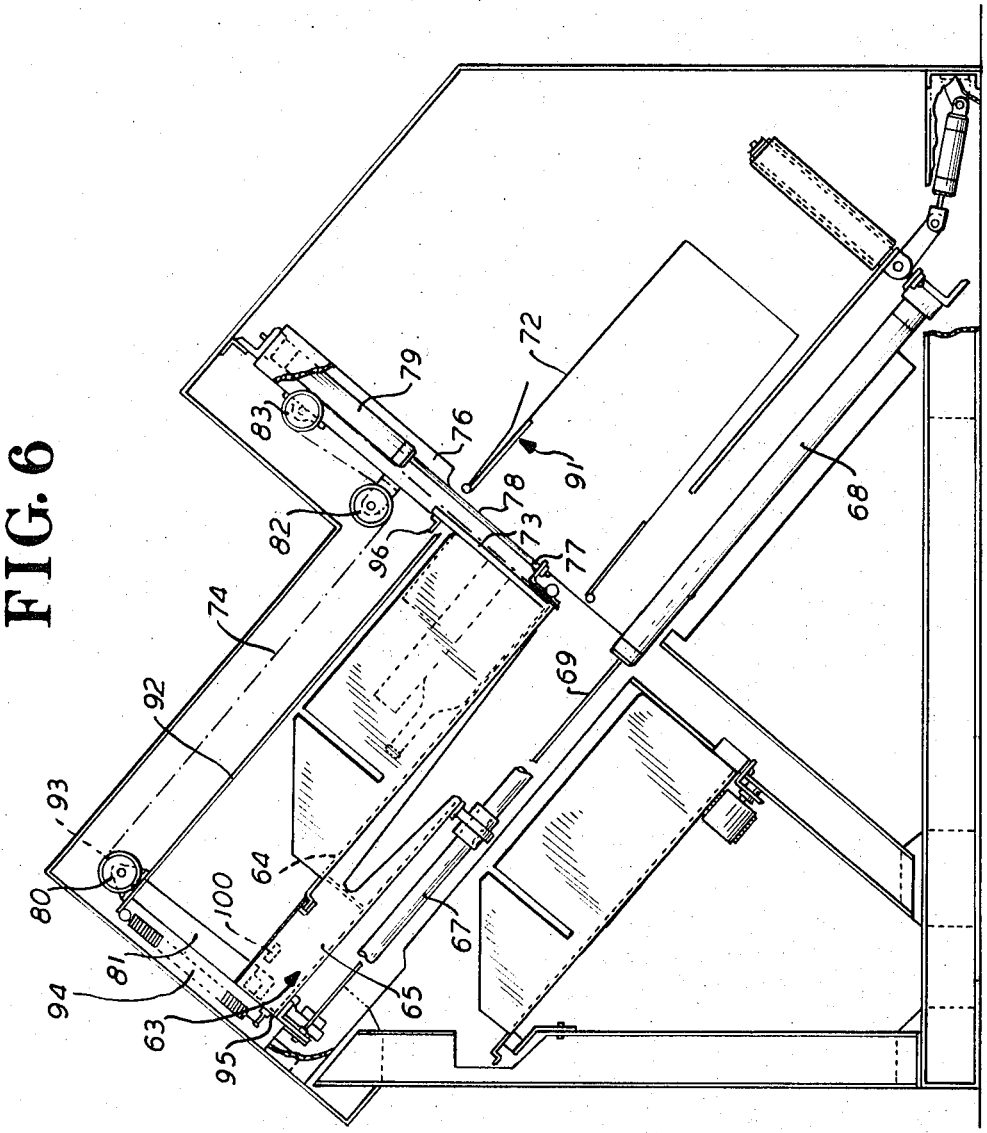

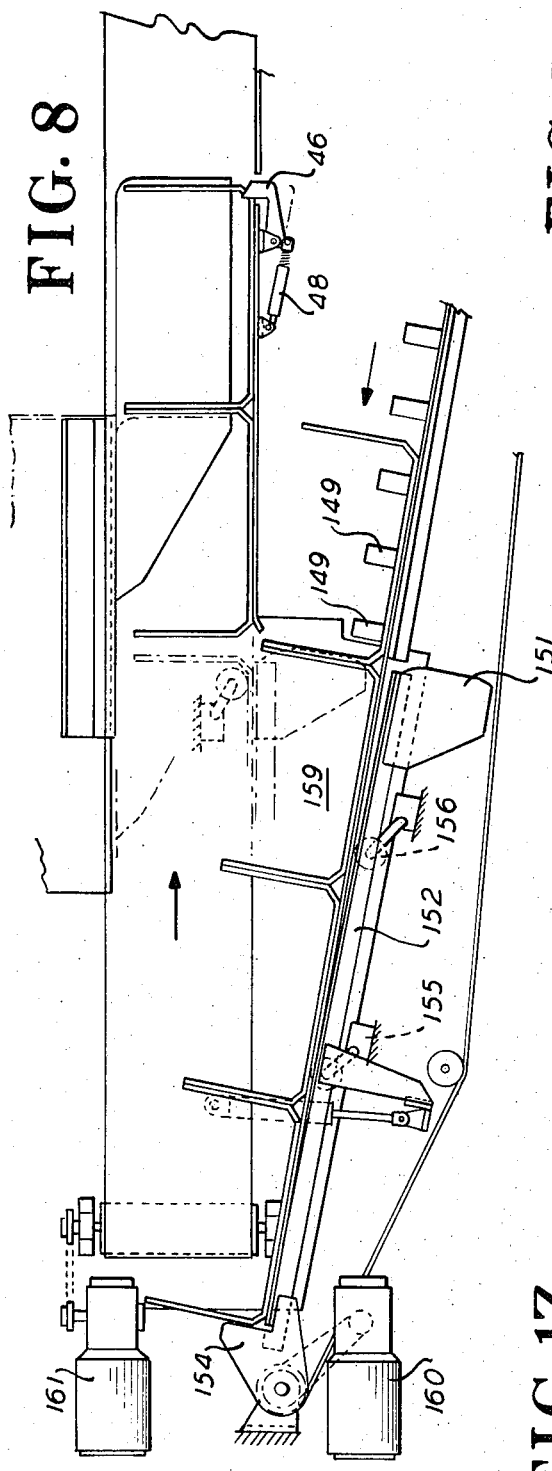
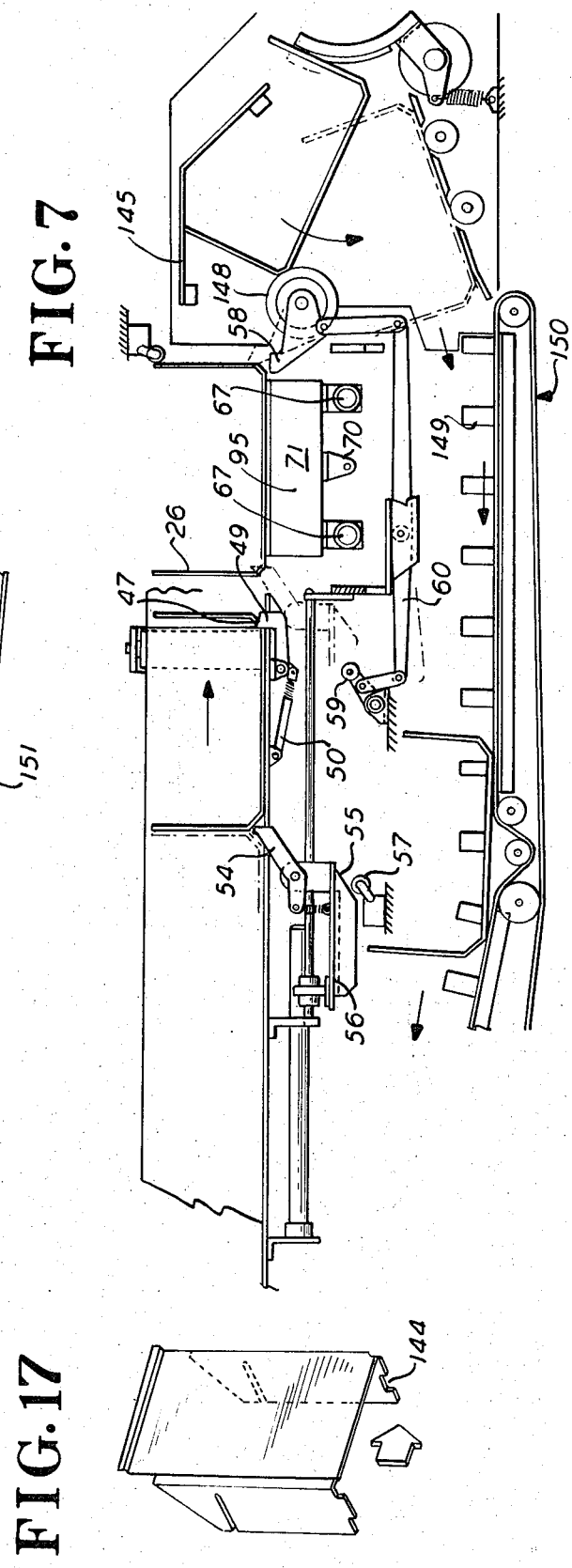

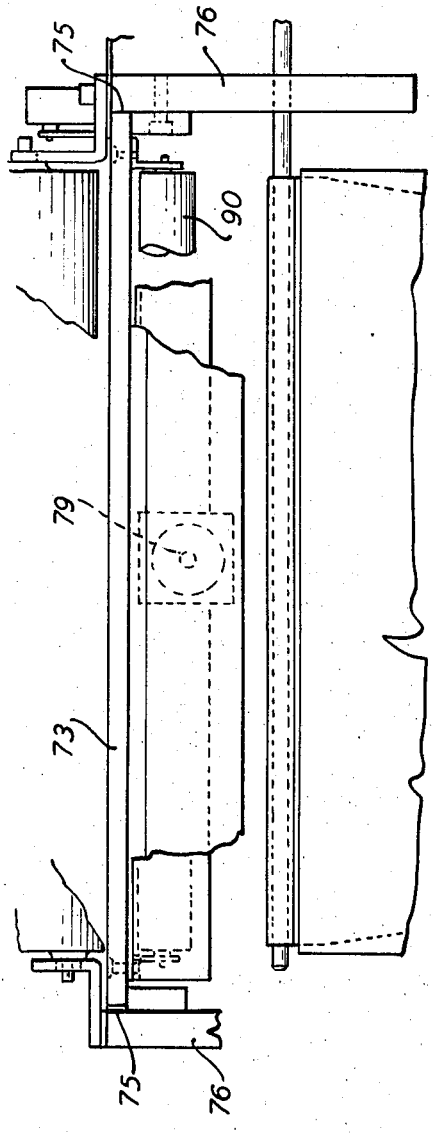
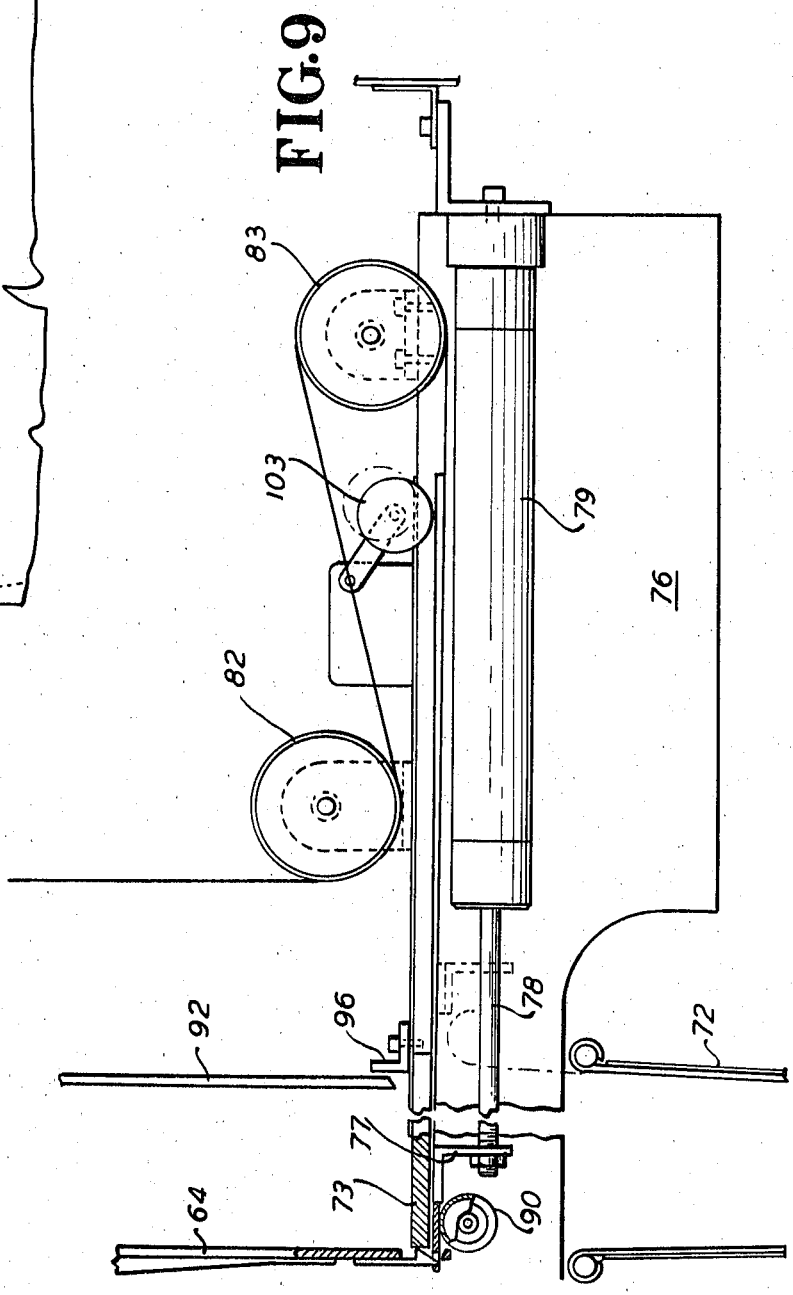

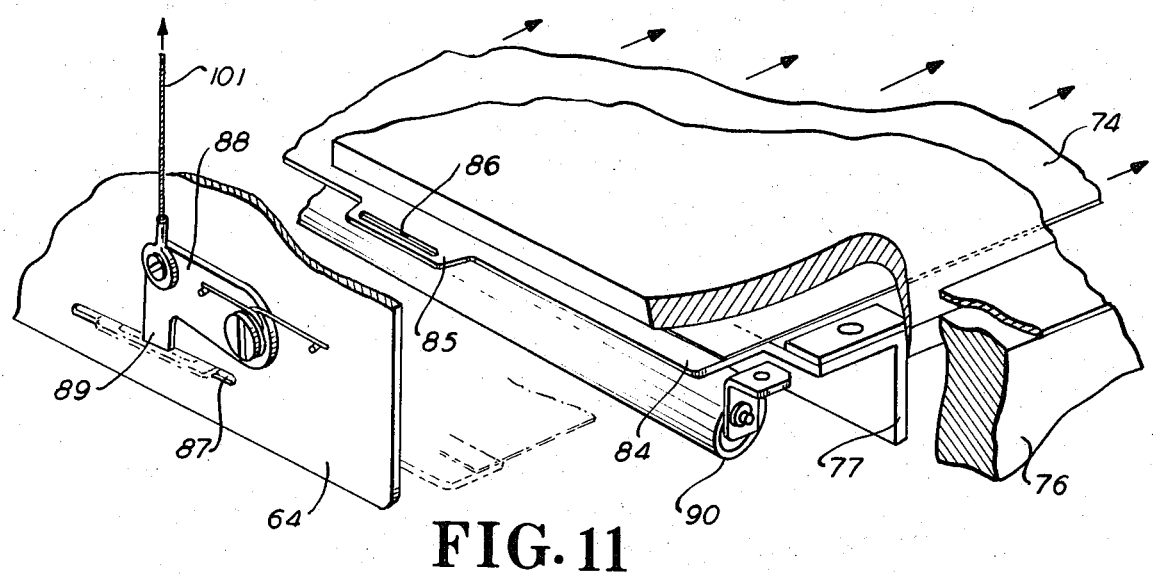
FIG. 11
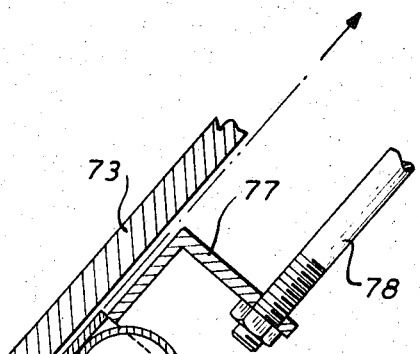
FIG. 12
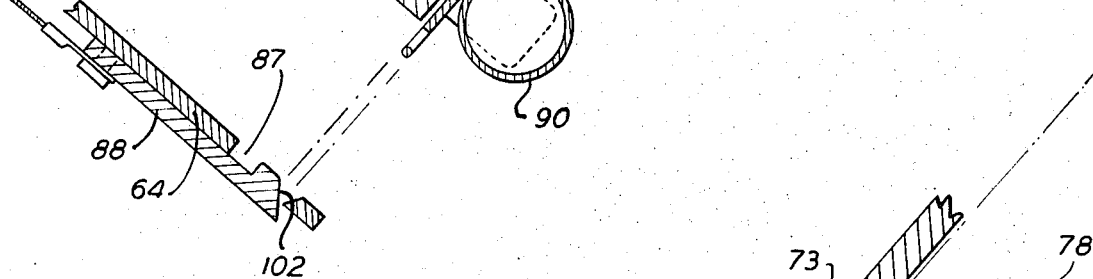
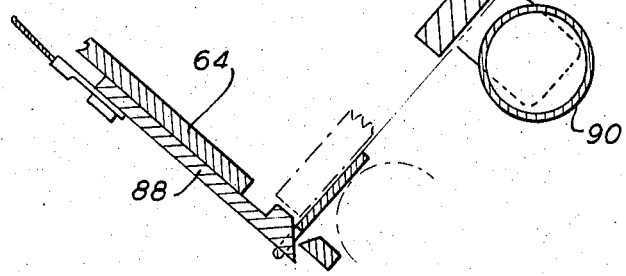
FIG. 13

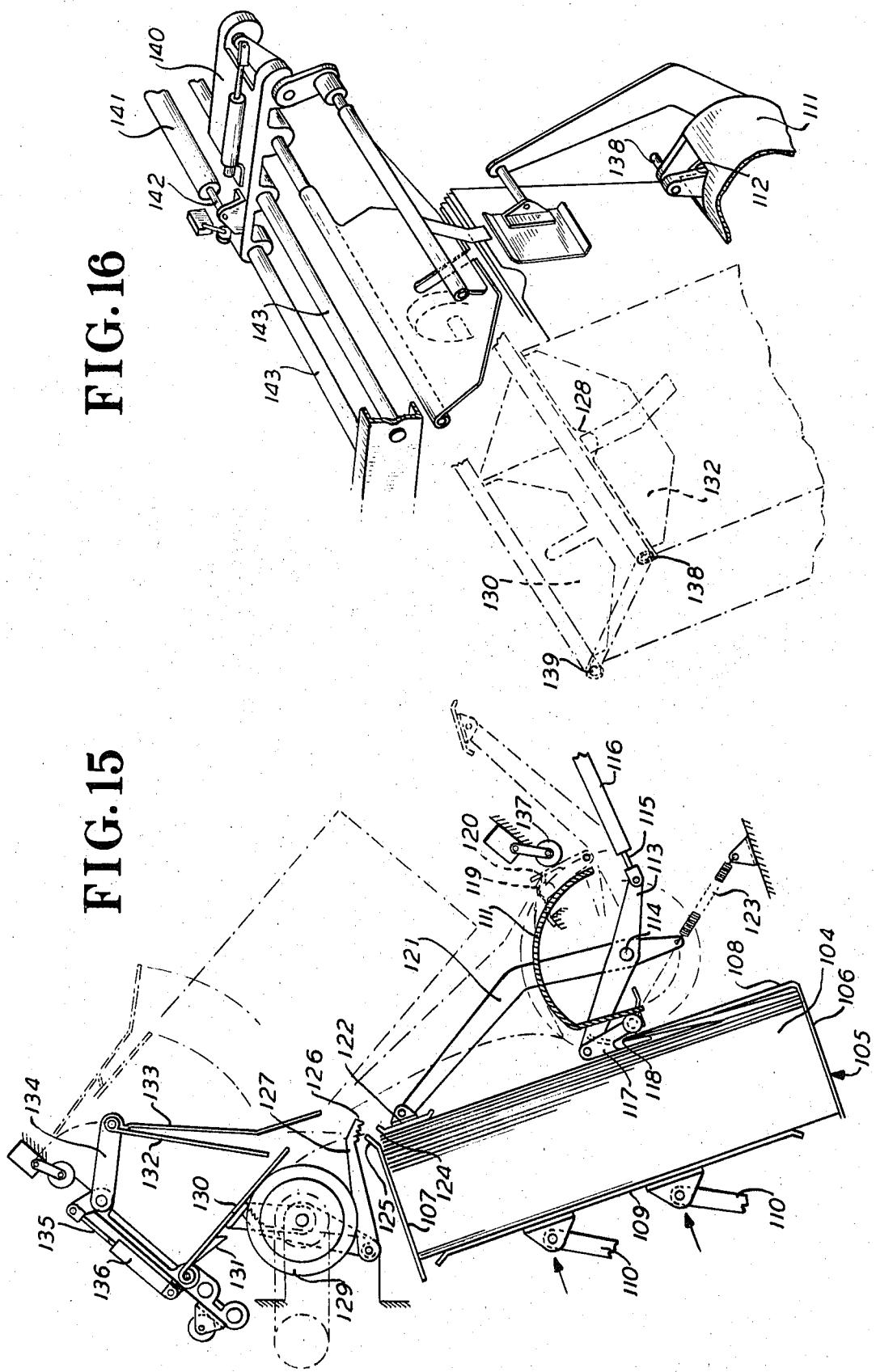

APPARATUS AND METHODS FOR MERCHANDISE TALLYING AND AUTOMATIC BAGGING

This is a continuation of application Ser. No. 339,780 filed 3-12-73.

BACKGROUND OF THE INVENTION

All self-service retail establishments employ some sort of check-out stand at which a total charge is determined and the merchandise is placed in some suitable container to be carried from the premises. The supermarket or grocery store is representative of such retail establishments.

A number of distinct operations are performed by the check-out operator in the supermarket. Firstly, the customer usually places merchandise collected in a mobile cart upon the top of a check-out stand. Frequently, the top of the stand is provided with a conveyor which may be intermittently energized by the check-out operator who bring merchandise from the point of placement on the check-out stand to the cash register.

The check-out operator then tallies the cost of each article of merchandise on a cash register while moving each article in turn to a downstream position on the check-out stand or counter.

In rare instances, the downstream surface of the check-out counter may be inclined or provided with intermittently or continuously operable conveyor means to move merchandise away from the register location. However, by far the most common practice is for the check-out operator to physically slide the merchandise along a level surface downstream from the register to make room for additional items as they are tallied.

After the merchandise has been tallied, it must be placed in some suitable container such as a bag. While a wide variety of bags have been tested, almost without exception the usual supermarket or grocery store employs the gusseted kraft paper bag for a wide variety of reasons. Nevertheless, no matter what form of bag or container is employed, care must be taken to place the heavy, more dense items of merchandise packaged in the stronger containers at the bottom of the bag or container with the less dense, more fragile merchandise on top.

The bagging operation may be performed by either the register operator or by a second person standing downstream from the register operator. If bagging is undertaken by the register operator, the entire bulk of merchandise must first be tallied, a total determined, payment made and change returned to the purchaser before the bagging operation commences. The register operator must then select from a disordered array of merchandise, those items which should be placed at the bottom of the bag as against those items which should be placed at the top of the bag. This sequential operation by the cash register operator is extremely time consuming and is unacceptable in peak hours.

On the other hand, if a second person is employed for the job of bagging the merchandise, labor costs are doubled. Additionally, the average customer stacks merchandise in the grocery cart with the heavier merchandise at the bottom and the lighter merchandise at the top. As a result, it is the lighter merchandise which is tallied first by the register operator and moved downstream for bagging, the heavier merchandise to follow. As a result, even if a person is employed solely for the purpose of bagging merchandise, relieving the operator of this duty, that person must usually wait until most of the merchandise has been tallied before he can commence bagging. At very least, the merchandise arrives downstream from the register for bagging in a random distribution with respect to weight, density and fragility. Consequently, even with the use of two persons at the check-out stand, there is an inordinant delay in the final bagging of the merchandise together with an enormous increase in cost.

The solution to the twin problem of time and money lies in an automatic merchandise tally and bagging apparatus which requires but one operator and which provides for automatic bagging of merchandise according to weight, density and fragility.

It is among the objects and advantages of the present invention to provide methods and apparatus for automatic merchandise tallying and bagging which requires but a single operator who places merchandise into a container or cassette having a rear wall and a pair of generally parallel spacedapart side walls but which is open at its top, front and bottom and preferably which has an intermediate shelf which may be slidably withdrawn without disturbing merchandise thereon, the operator vertically stacking merchandise through the open front thereof according to weight, density and fragility with one hand, while at the same time tallying the cost thereof on an appropriate register with the other hand.

Another object of the present invention is to provide methods and apparatus for automatic merchandise tallying and bagging in which the aforesaid cassettes are inclined at an angle to the vertical to prevent accidental discharge of merchandise through the open front end thereof, the cassettes moving downstream from the register operator on an intermittently energizable conveyor to a reciprocating bag loading assembly, a fresh supply of cassettes automatically appearing adjacent to the operator at the register.

Yet a further object of the present invention is to provide methods and apparatus for automatic merchandise tallying and bagging as aforesaid in which a retractable support is provided beneath the merchandise in the cassette located in the bagging assembly as the bagging assembly and cassette move obliquely downwardly into the open mouth of a bag, the support means retracting from beneath the merchandise in the cassette proximal to the bottom of the bag to discharge merchandise therewithin, the bagging assembly with the empty cassette reciprocating before upwardly from the bag.

Yet still another object of the present invention is to provide methods and apparatus for automatic merchandise tallying and bagging as aforesaid in which means are provided for recycling empty cassettes from the bagging assembly to the register location for reuse together with appropriate means for feeding, opening and positioning bags beneath the reciprocating bag loading assembly.

SUMMARY OF THE INVENTION

An automatic merchandise tally and bagging apparatus comprising a counter, a cassette-loading station contiguous to the counter, a rear support wall on the cassette-loading station inclined at an angle from the vertical, conveyor means extending along the rear support wall, a cassette in the cassette loading station, the cassette having a rear wall and pair of opposed, spaced-apart side walls, the cassette being open at the front and bottom and adapted to receive merchandise the rear wall of the cassette being supported by said inclined support wall and the said conveyor means, a reciprocating bag loading assembly at the end of the conveyor means opposite the bag loading station, means for moving cassettes from the conveyor means into the bag loading assembly, retractable support means on the bag loading assembly beneath the cassette as it enters the bag loading assembly, means for reciprocating the bag loading apparatus downwardly into an open bag therebeneath and upwardly from said bag, means for retracting the said support means from beneath the merchandise in the cassette when the bag loading assembly is proximal to the bottom of the bag and returning the said retractable support means to a position beneath the next ensuing cassette to enter the bag loading assembly.

A method for tallying and automatically bagging merchandise comprising stacking articles in container means open at the front and bottom in generally vertical tiers, the heavier articles lying beneath the lighter articles, the rear wall of the container means being inclined from the vertical, moving the said tiers of articles latitudinally while at said inclined angle to a bag loading station, reciprocating the contained merchandise generally downwardly into an open bag while simultaneously supporting the merchandise from beneath, removing the said support from the merchandise proximal to the bottom of the bag and withdrawing the empty container upwardly from the bag.

PREFERRED EMBODIMENT OF INVENTION

The objects and advantages aforesaid as well as other objects and advantages may be achieved by the automatic check-out apparatus a preferred embodiment of which is illustrated in the drawings in which:

FIG. 6 is an end elevational cross-sectional view of the bag loading assembly taken along lines 6—6 in FIG. 5 looking in the direction of the arrows;

FIG. 7 is an oblique plan view of the cassette return assembly at the loaded bag discharge end of the apparatus;

FIG. 8 is an oblique plan view of the cassette return and feed assembly proximal to the cassette loading and check-out register station;

FIG. 9 is an enlarged, end elevational view of a portion of the bag loading assembly illustrated in FIG. 6;

FIG. 10 is an end elevational view of that portion of the bag loading assembly illustrated in FIG. 9 looking from the right side thereof;

FIG. 11 is an enlarged view in perspective of a portion of the bag loading assembly illustrated in FIGS. 9 and 10;

FIG. 12 is an end elevational cross-sectional view of that portion of the bag loading assembly illustrated in FIG. 11;

FIG. 13 is an end elevational cross-sectional view of that portion of the bag loading assembly illustrated in FIG. 12 showing the loading curtain in another position in the sequence of operation;

FIG. 15 is an end elevational cross-sectional view of the bag opening and feeding assembly;

FIG. 16 is an enlarged view in perpective of the upper portion of the bag opening and feeding assembly illustrated in FIG. 15;

FIG. 17 is a view in perspective of a cassette;

Figure 1:
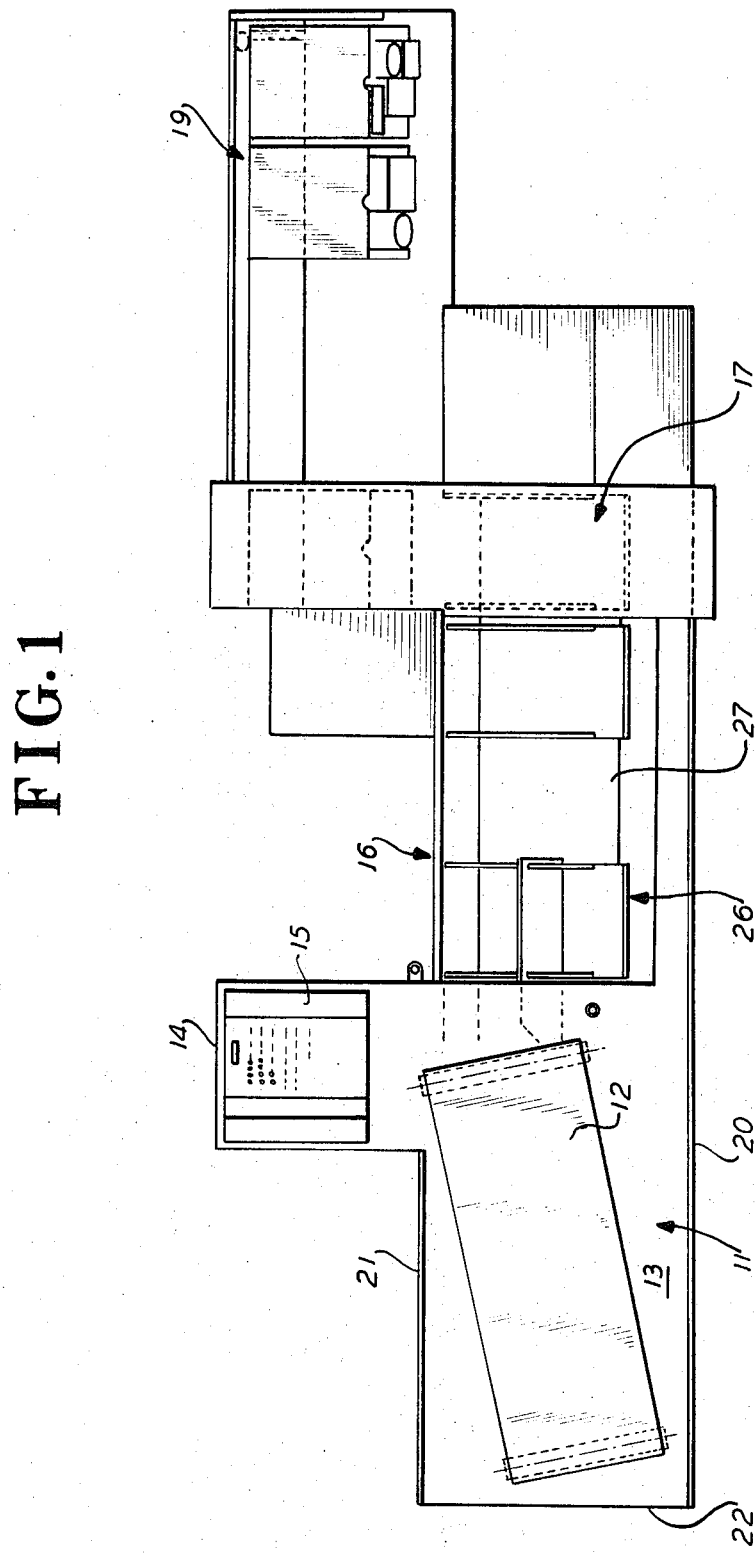
FIG. 1 is a top plan view of the automatic check-out bagging apparatus.
Figure 2:
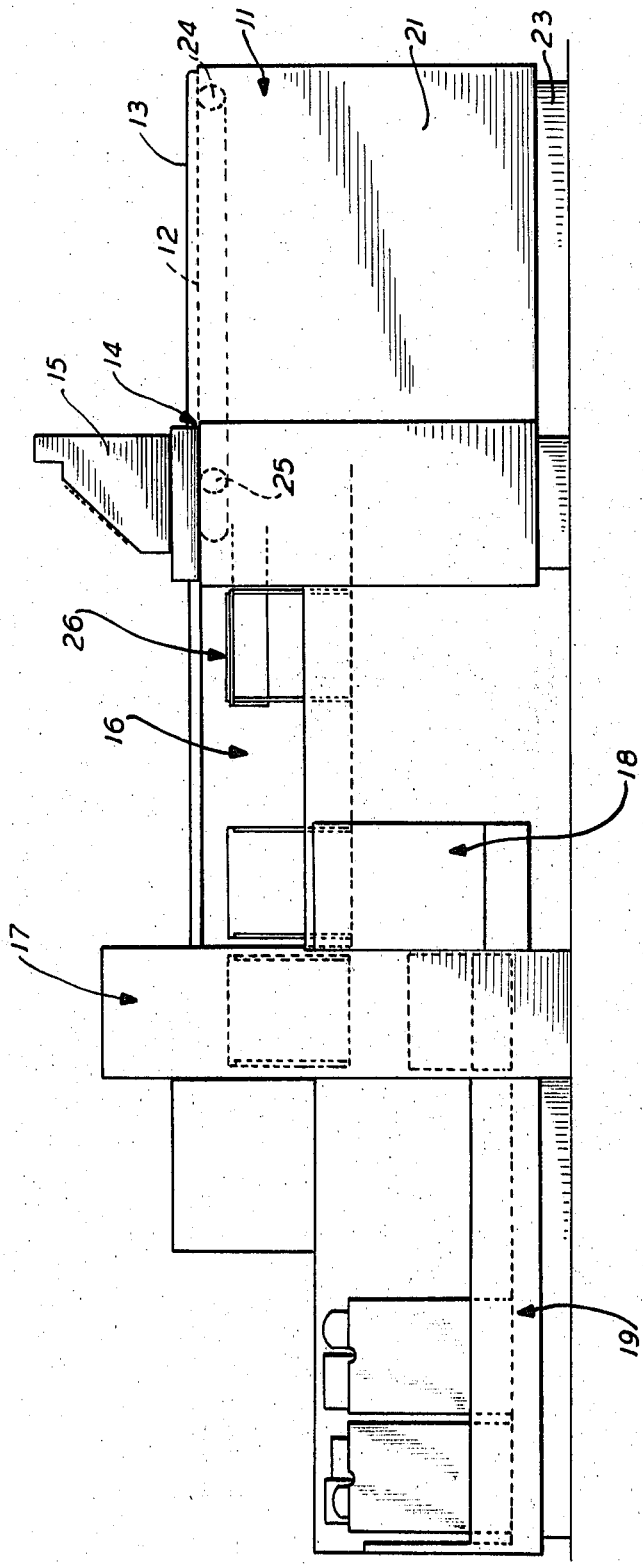
FIG. 2 is rear elevational view of the apparatus illustrated in FIG. 1.
Figure 4:
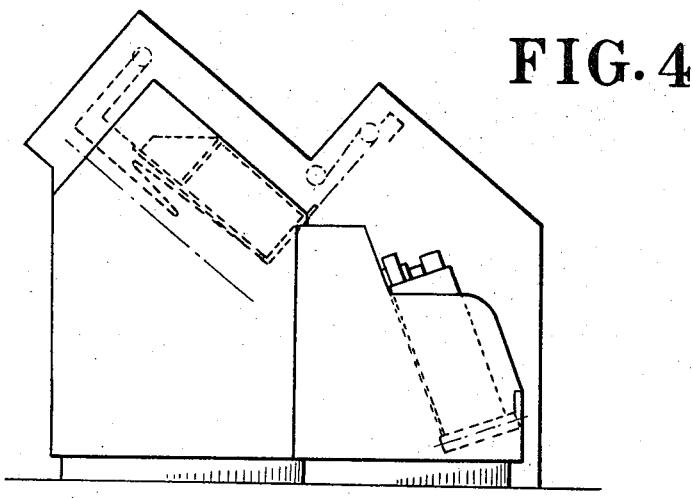
FIG. 4 is an end elevational view of the loaded bag discharge end of the apparatus schematically showing the bag loading assembly in broken lines.

Referring now to the drawings in detail and in particular to FIGS. 1 and 2, the automatic check-out bagging apparatus comprises a check-out counter 11 having a generally horizontal power driven conveyor 12 in the top 13 thereof. The conveyor 12 is oriented at an angle to the longitudinal axis of the check-out counter 11 toward the cash register station 14 upon which a cash register 15 is mounted. While a cash register 15 has been illustrated and described, station 14 could accommodate any computer terminal adapted to compute the total charge for the merchandise purchased as well as maintain a running inventory of merchandise. For instance, station 14 could be provided with manually or automatically operable scanning mechanisms which scan price or other indicia on goods moving on the conveyor for purposes set forth above.

It is preferred that the conveyor 12 be oriented toward the cash register station 14 so that the operation is able to encompass within the limits of normal peripheral vision not only the discharge end of the conveyor 12 but also the cassette loading station 16 downstream from the conveyor 12 with respect to the direction of flow of merchandise. The cassette loading station 16 is shown in greater detail in FIG. 3.

The flow of merchandise passes from the cassette loading station 16 to a bag loading station 17. A bag opening and feeding station 18 is operatively positioned with respect to the bag loading station 17.

The flow of merchandise passes from the bag loading station 17 to a bag terminal or discharge station 19 from whence bags are removed manually by customers.

The check-out counter 11 is of generally conventional design comprising front and rear walls 20 and 21, an end wall 22, and a base 23.

The conveyor 12 is also of conventional design having the usual end rollers 24 and 25. The conveyor 12 may be driven by any conventional means which are well known in the art which need not be described in greater detail.

Figure 3:
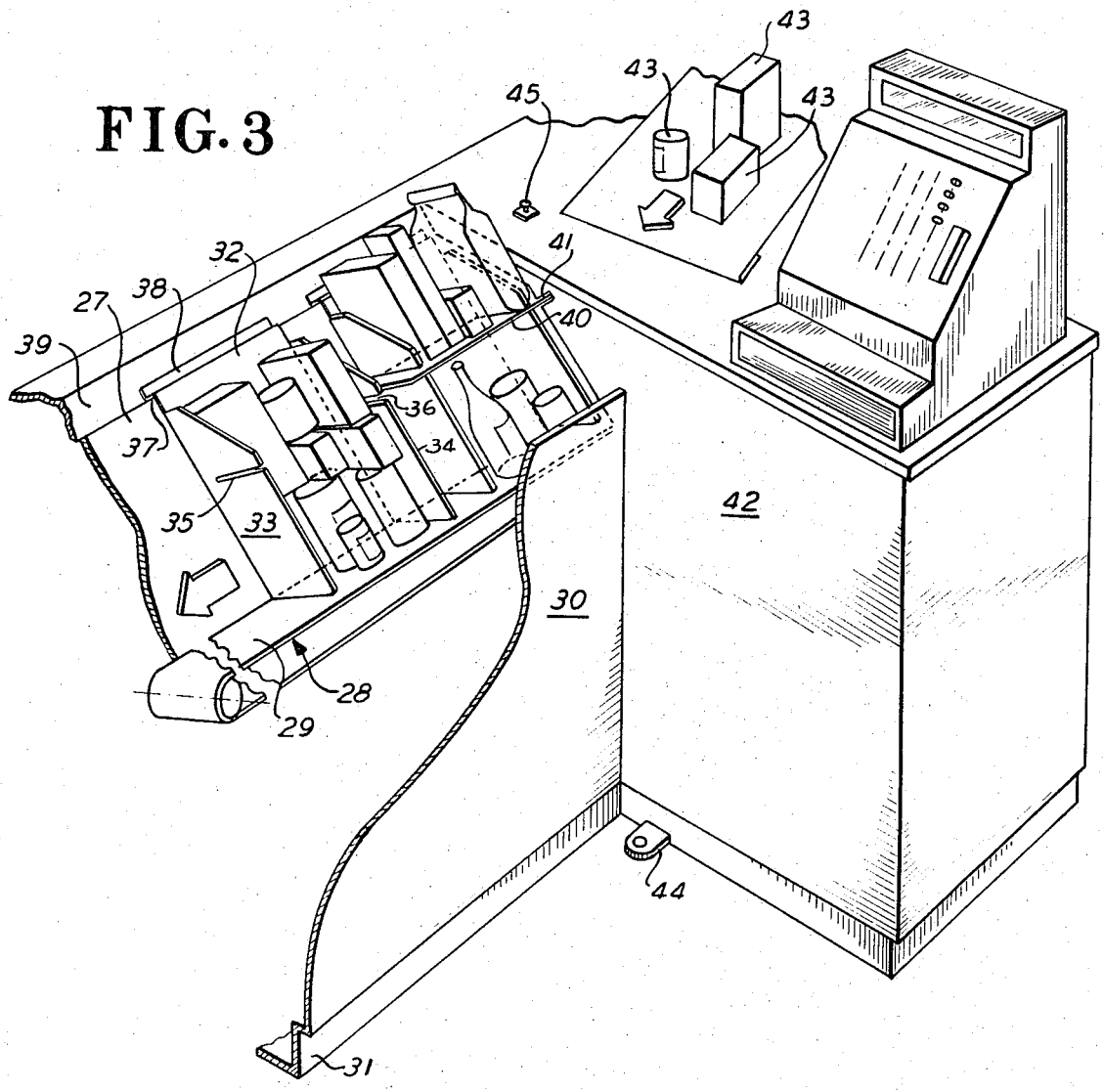
FIG. 3 is a view in perspective of the register and cassette loading station.

The cassette loading station 17 is illustrated in detail in FIG. 3 and comprises an inclined support wall 27 oriented at an angle of from approximately 30° to 60° from the vertical with an angle of 45° preferred.

A power driven conveyor 28 forms the floor to the cassette loading station 16 supporting cassettes 26, 26 etc. The plane of the upper run 29 of conveyor 28 is normal to the inclined support wall 27. A generally vertical retaining wall 30 extends from a position slightly above the top course 29 of conveyor 28 downwardly to a base 31 on the cassette loading station 16. That portion of wall 30 extending above the upper run 29 of conveyor 28 provides additional insurance against merchandise accidentally dropping from the cassette loading station 16 onto the floor.

The cassettes 26 illustrated in detail in FIGS. 7 and 17, comprise a rear wall 32 and a pair of generally parallel spaced apart side walls 33 and 34 formed thereon. The side walls 33 and 34 are each tapered at the top, being provided with an inclined portion extending generally from a position near the mispoint toward the rear wall 32. Immediately beneath the inclined portions of the side walls 33 and 34 are slots 35 and 36 respectively lying in a plane generally parallel to the plane of the conveyor 28. The top edge of the rear wall 32 is provided with an offset 37 defining an upwardly extending flange 38. The flange 38 slides against a rail 39 offset from the inclined support wall 27. The bottom of the cassette 26 is open intermediate the side walls 33 and 34. Preferably, an intermediate shelf 40 is intruded in slots 35 and 36 during loading. However, shelf 40 may be removed from slots 35 and 36 after the cassette 26 has been loaded as hereinafter described. Conveniently, the shelf 40 may be slidably mounted in a cooperative slot 41 in the end wall 42 of the cash register station 14 to be slid inwardly and outwardly as desired.

In operation, the customer places merchandise 43 (shown in FIG. 3) on the conveyor 12. The conveyor 12 is preferably of the character than can be energized and de-energized by a foot tredle 44 at the cash register station 14 so that the operator may advance merchandise 43 to the discharge end of the conveyor 12 at will.

The register operator operates the register with the right hand while removing merchandise from the conveyor 12 and placing it in the most proximal cassette with the left hand.

Preferably, the shelf 40 has been intruded in slots 35 and 36 of the most proximal cassette defining upper and lower storage areas. Lighter merchandise is placed in the upper storage level supported by shelf 40 whereas heavier merchandise is placed in the lower storage compartment resting on the upper course 29 of conveyor 28.

Merchandise are vertically stacked in the cassette 26 as received from the conveyor 12. In the event an excessively tall item is received from conveyor 12 it may be stacked in the cassette by sliding shelf 40 into the register stand 14 permitting the item to assume a generally upright position in the cassette 26.

When the most proximal cassette 26 is fully loaded, the register operator energizes conveyor 28 by means of push button 45 on the top 13 of the check-out counter 11 proximal to the register station 14. Of course, push button 45 may be placed in any location convenient to the register operator.

When the conveyor 28 is energized, the most proximal cassette 26 is moved in the direction of the bag loading station 17. As the cassette 26 moves away from the most proximal position, the shelf 40 remains stationary sliding within slots 35 and 36 until fully withdrawn permitting the lighter merchandise in the upper portion to fall gently downwardly until they rest upon merchandise in the lower section. Because the support wall 27 is inclined within the aforesaid range of angles to the horizontal, there is little or no tendency for merchandise to fall in a rotary motion away from support wall 27. Additionally, the cassette 26 now contains merchandise properly oriented for intrusion into a bag with the heavier merchandise on the bottom and the lighter merchandise on the top.

It is important that the cassette 26 proximal to the cassette loading station 16 be positively retained in that position during loading. The conveyor 28 is energized by push button 45 for a predetermined time interval which is sufficient to bring an empty cassette 26 into the loading position as well as move the previously loaded cassette 26 into a docking position adjacent to the bag loading station 17.

In order to insure that an empty cassette 26 is precisely positioned proximal to the register station 14, a pawl 46 (illustrated in FIGS. 5 and 8) engages a slot 47 in the bottom of the cassette 26 at the intersection of the rear wall 2 and side wall 33. The pawl 46 is normally spring-loaded into engagement with the cassette 26 restraining movement with the conveyor 28. The pawl is operatively connected to an air cylinder 48 which is momentarily energized by push button 45 which also actuates the conveyor 28.

Conveyor 28 carries the cassette 26 to a docking position adjacent to the bag loading station 17. When the cassette 26 reaches the docking position, it is positively retained therein by means of a spring-loaded pawl 49 engageable with slot 47 in the cassette 26 in a fashion substantially identical to pawl 46 at the loading station 17. Pawl 49 is operatively connected to an air cylinder 50 actuated by limit switch 51.

When cassette 26 reaches the docking position and engages pawl 49, it simultaneously engages limit switch 51 (shown in FIG. 5) which functions to positively detect the presence of cassette 26 in the docking position. Limit switch 51 in turn energizes an air cylinder 52 which drives a carrier plate 53 in the direction of the bag loading station 17.

Carrier 53 plate mounts upper and lower ram fingers 54, 54 which engage the rear wall 32 of cassette 26 at the top of side wall 33 and slot 47 respectively driving cassette 26 toward the bag loading station 17.

In order to release pawl 49 to permit movement of the cassette 26 into the bag loading station 17, a cam surface 55 formed upon mounting bracket 56 for ram finger 54 engages a limit switch 57 illustrated in FIG. 7.

Movement of the cam surface 55 actuated limit switch 57 in turn energizing air cylinder 50 disengaging pawl 49 from the cassette 26 in the docking position.

It is also important to limit the motion of the cassette 26 into the loading station 17 to fix its position therein. This is accomplished by means of a pivotal abutment arm 58. Pivotal abutment arm 58 when in the position shown in broken lines in FIG. 7, is adapted to engage the side wall 33 of cassette 26 when it is properly located within the bag loading station 17. Pivotal abutment arm 58 is actuated by means of cam surface 55 engaging lever 59 which is pivotally connected to interceptor linkage 60 operatively connected to arm 58 thereby driving it into an abuting position.

In order to insure smooth movement of carrier 53, it is mounted on a pair of ball-bushing guides 61-61-61 riding on shafts 62-62.

Once the cassette 26 has been properly positioned within the bag loading station 17, the bag loading operation commences. The bag loading station 17 comprises a bag loading assembly which is movable at right angles to the top course 29 of conveyor 28 which has transported cassettes 26 from the cassette loading station 16 to a docking position adjacent to the bag loading station 17.

Referring to FIGS. 6 and 7, the bag loading assembly 63 comprises a support wall 64 which lies in the same plane as support wall 27 extending from the cassette loading station 14. A pair of spaced-apart side walls 65, 66 are formed on the support wall 64 and extend in a direction opposite the cassette 26. The bag loading assembly 63 is mounted on a pair of spaced apart, parallel, ball bushing guide shafts 67, 67. The bag loading assembly 63 is driven along the ball bushing shafts 67 by means of a double acting pneumatic cylinder 68 which is connected through rod 69 to a fitting 70 proximal to the top 71 of the bag loading assembly 63.

Operationally, it is intended that the merchandise intermediate the side walls 32 and 33 of the cassette 26 in the loading station 17 be intruded downwardly into an open bag 72 by means of downward motion of the bag loading assembly 63 into the said open bag 72. In order to perform this operation, it is necessary to provide the loading station 17 with a releasable bottom plate 73 illustrated in greater detail in FIGS. 9 and 10. Bottom plate 73 is coplanar with the upper course 29 of conveyor 28 when the bag loading assembly 63 is in the uppermost position. As the cassette 26 moves from the docking position into the loading station 17, the contents within the cassette 26 slide from the upper course 29 of conveyor 28 onto the bottom plate 73 of the loading assembly 63.

Operationally, the bottom plate 73 must be withdrawn from beneath the cassette 26 to permit downward movement of the merchandise therein into bag 72. However, simply withdrawing of the bottom plate 73 would permit the merchandise to freely fall into the bag 72 damaging the merchandise and/or the bag. Therefore, a simple merchandising dumping operation is not feasible.

In order to avoid dumping the merchandise, the reciprocating bag loading assembly 63 has been devised. The object of the bag loading assembly 63 is to intrude the assembly 63 with the merchandise into the bag 72 while continuously supporting the merchandise from beneath to prevent dropping except to an insignificantly minor degree at the bottom of the stroke.

The merchandise within the cassette 26 in the loading station 17 is supported from beneath after removal of the bottom plate 73 by means of a releasable and retractable curtain 74. Operationally, the curtain 74 extends beneath the cassette 26 being fastened at one end to the bottom of the support wall 64 of the bag loading assembly 63. At the bottom of the stroke of the bag loading assembly 63, the curtain 74 is released from the support wall 64 withdrawing automatically from beneath the merchandise while immediately proximal to the bottom of the bag 72 retracting to a reset position. This in turn frees the merchandise within the bag 72 and permits the return of the bag loading assembly 63 to its top most position. The curtain operating assembly will be described in greater detail below.

Referring now to FIGS. 9 and 10 in detail, the side edges of the bottom plate 73 of the bag loading assembly 63 are intruded within opposed guide channels 75, 75 supported by frame members 76, 76. A bracket 77 is secured to the bottom of the plate 73. Bracket 77 is mounted to a connecting rod 78 operatively connected to a double acting pneumatic cylinder 79. Cylinder 79 drives the plate 73 toward and away from the support wall 64 of the bag loading assembly 63.

The operating assembly of curtain 74 is illustrated in detail in FIGS. 5, 6, 9, 10, 11, 12 and 13. The curtain 74 is attached to a tortionally loaded roller 80 mounted on brackets 81 attached at their opposite ends to the bag loading assembly 63. The curtain 74 extends downwardly as shown in FIG. 6 to an idler roller 82 and from thence forwardly to and around the second idler roller 83 mounted on frame 76 as is roller 82. The curtain extends thereafter rearwardly toward and beneath the bottom plate 73. The terminal end of the curtain 74 is provided with a relatively thick, rigid end plate 84 shown in detail in FIG. 11. The end plate 84 is provided with a coplanar tongue 85 having a transverse slot 86. The tongue 85 is adapted to project through a cooperative slot 87 in supporting wall 64 of the bag loading assembly 63. A spring-loaded, pivotal latch 88 is mounted on the supporting wall 64 having a pivotably mounted finger 89 operatively movable downwardly through the slot 86 in the tongue 85 when it projects through the cooperative slot 87 on the supporting wall 64.

In order to insure that the end plate 84 on curtain 74 is oriented at right angles to the supporting wall 64 so as to permit the tongue 85 to pass through the slot 87, a roller 90 is provided mounted to the bottom of the plate 73. Because the roller 90 moves with the plate 73 as the plate 73 approaches the supporting wall 64, the end plate 84 on the curtain 74 is trapped between the bottom of bottom plate 73 and the top of roller 90 orienting the tongue 85 at right angle to the supporting wall 64. The operational significance of this movement will be described in greater detail later.

The bag 72 is supported in an open position beneath the bag loading assembly 63 by means of a bag opening and holding assembly 91 which is shown in greater detail in FIGS. 15 and 16 and will be described later. Nevertheless, in operation, the basic object is to intrude the contents of the cassette downwardly into the bag 72 by means of the movement of the bag loading assembly 63 as illustrated schematically in FIGS. 14A–14E. In order to intrude the contents of the cassette 26 into the bag 72, it is first necessary to withdraw the bottom plate 73 from beneath the cassette 26 in the bag loading station 17 without permitting the merchandise to dump or freely fall a significant distance into the bag 72. Hence, the curtain 74 has been devised to provide bottom support for the contents of the cassette 26 as the bag loading assembly 63 descends into the bag 72. This is accomplished by means of the fact that the end plate 84 on the curtain 74 remains fastened to the supporting wall 64 of the bag loading assembly 63 as the bag loading assembly descends into the bag. The curtain 74 extends beneath the merchandise forwardly and then upwardly in front of a guide plate 92 which is pivotably mounted at its top to a fitting supporting by shaft 93 upon which the torsionally loaded roller 80 is mounted. A spring 94 extends between the top of plate 92 and the top 95 of the bag loading assembly 63. A stop 96 mounted on frame 76 carrying the bottom plate 73 limits the forward pivotal movement of the guide plate 92.

Figure 14B:
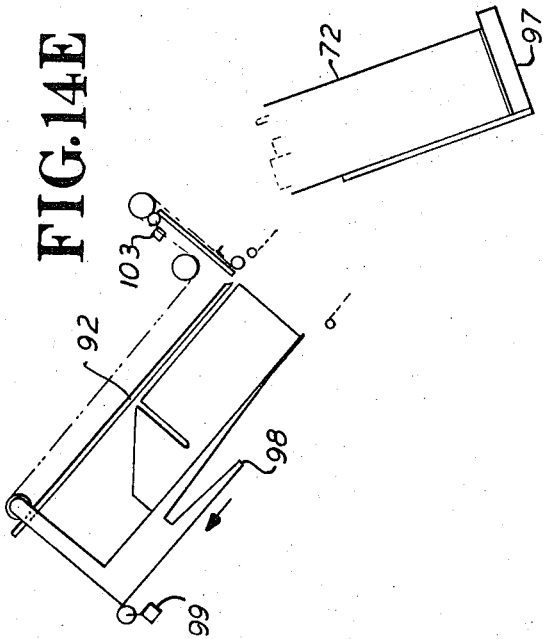
FIGS. 14A, 14B, 14C, 14D and 14E are sequential, schematic end elevational view of bag loading assembly illustrating the loading sequence.

Guide plate 92 is adapted to be pivotably compressed inwardly toward the merchandise as the bag loading assembly 63 descends into the bag 72 by means of the curtain 74 as shown in FIG. 14B. This ensures that plate 92 will compress the merchandise to a sufficient degree to insure that it fits within the confines of the open top bag 72.

As the bag loading assembly 63 descends with the merchandise supported by the curtain 74 toward the bottom of bag 72, bag 72 is carried downwardly free from the bag opening and holding mechanism 91 to rest upon the floor 97 of the bag loading station 17.

At this point, an actuating lever 98 on the bag loading assembly 63 engages and actuates a limit switch 99 energizing a solenoid 100. The armature of solenoid 100 is connected to an actuating wire 101 attached to the pivotal latch 88. Thus, when solendoid 100 is energized, wire 101 is drawn upwardly releasing the finger 89 from within the slot 86 in the tongue 85 on the end plate 84 attached to the curtain 74. Since curtain 74 has reached its fully extended position, torsionally loaded roller 80 draws the now free curtain end plate 84 across the bottom of the merchandise in the bag 72 as illustrated in FIG. 14D reaching a position immediately beneath the guide plate 92. The curtain 74 now lies intermediate the guide plate 92 and the side of the bag 72. At this position, the torsion of roller 80 has been substantially exhausted.

Figure 14E:
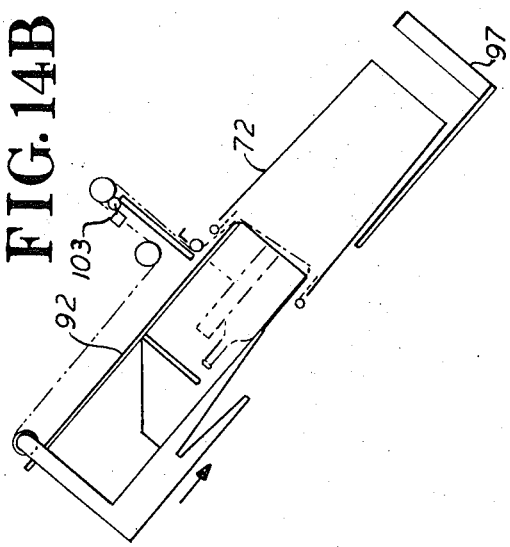
Figure 14A:
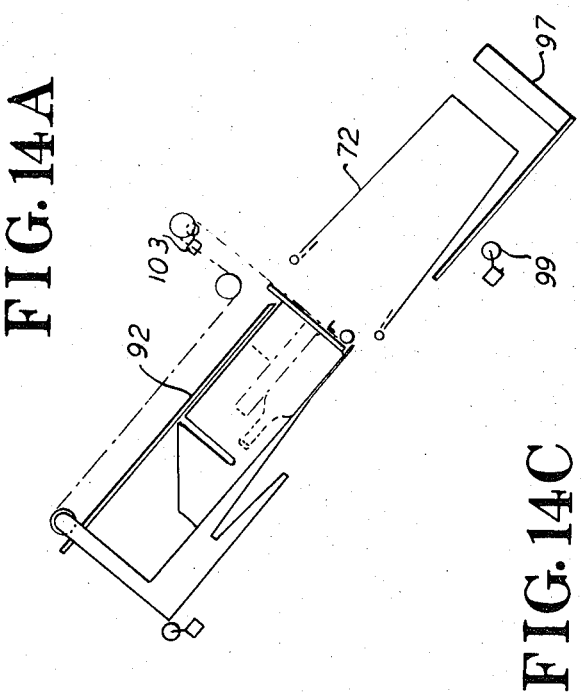
Figure 14D:
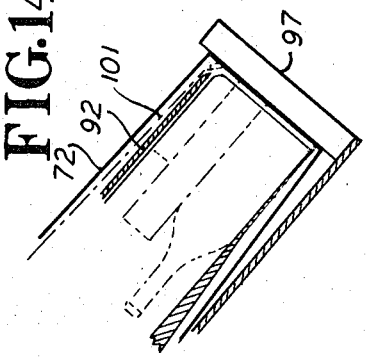
Figure 14C:
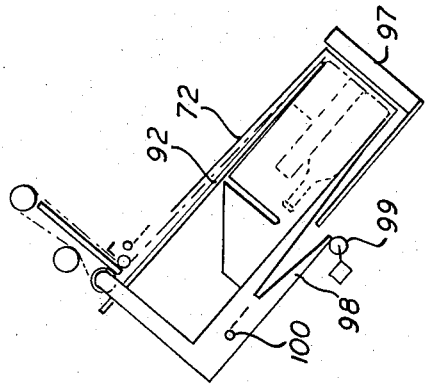

The bag loading assembly 63 now reverses direction moving upwardly as illustrated in FIG. 14E until it reaches its uppermost position as shown in FIG. 6. Because the curtain 74 has been freed from the supporting wall 64 of the bag loading assembly 63, the merchandise is left within the bag 72 as the bag loading assembly 63 retracts upwardly. Simultaneously, the curtain 74 is drawn upwardly to a position intermediate roller 90 in the bottom plate 73 thereby orienting the end plate 84 perpendicular to the supporting wall 64 of the bag loading assembly 63. As the bottom plate 73 is moved toward the support wall 64 the tongue 85 on the end plate 84 attached to the curtain 74 is intruded through the slot 87 as the tongue 85 passes through slot 87, it engages a cam surface 102 on the bottom of the finger 89 of latch 88 pivoting latch 88 upwardly against its spring load, thereafter snapping downwardly to project through the slot 87.

It is most important that the bottom plate 73 be moved to its most forward position from beneath the bottom of the cassette 26 prior to the time the bag loading assembly 63 commences its downward motion to avoid severe damage to the entire assembly. In order to insure that the bottom plate 73 is in its most forward position, a limit switch 103, mounted on the frame 76 is actuated by the front of the bottom plate 73 when in the most forward position. Limit switch 103 must be actuated prior to the time the bag loading assembly 63 can commence its downward motion.

The bag 72 is contemplated as being of the usual square bottomed, kraft paper variety in common use today. These bags are normally folded flat when supplied to the grocery store. It is necessary to remove these bags from a stack, open and position them beneath the bag loading assembly 63.

A bag opening and feeding assembly 91 is shown in detail in FIGS. 15 and 16 and comprises a stack 104 of folded bags 72. The stack 104 is seated in a supporting chute 105 having a bottom 106, a top 107 and a front wall 108. The rear of the stack 104 is supported by a pressure plate 109 actuated by a pair of pivotal levers 110. The levers 110 normally urge the plate 109 forwardly driving the stack 104 of bags 72 toward the front wall 108 of the chute 105.

The front wall 108 merges with an arcuate guide surface 111 having a slot 112 therein. A pivotal arm 113 is mounted on a shaft 114 beneath the guide surface 11, the shaft 114 extending generally parallel therewith. The arm 113 is in registration with the slot 112 and is connected at one end to the actuating rod 115 of a pneumatic cylinder 116. The opposite end of arm 113 is connected to a pivotal gripper 117 which is adapted to grasp the upwardly projecting folded bottom edge 118 of the bag 72 lying on the front of the stack 104.

The gripper 117 is provided with a generally V-shaped slot 119 having a retainer 120 positioned therewithin. The retainer 120 will admit the top edge 118 towards the bottom of the slot 119 but will not let it retract therefrom.

A second pivotal arm 121 is mounted on shaft 114 and is provided with a foot 122 on the top end thereof. The opposite end of arm 121 is connected to an anchored spring 123 which normally urges the foot 122 into engagement with the top of the front of the stack 104 of bags 72 resisting pressure from pressure plate 109.

In operation, pneumatic cylinder 116 is energized drawing the rod 115 inwardly pivoting arm 113 so that the gripper 117 moves to a position to engage the edge 118 of the bottom of bag 72 on the top of stack 104 as illustrated in FIG. 15. Thereafter, cylinder 116 is energized oppositely causing the gripper 117 to draw the bottom of the bag upwardly and around the arcuate surface 111. This in turn causes the top edge 124 of bag 72 to move upwardly past the beveled leading edge 125 of the top 107 of chute 105.

As the top edge 124 of the bag 72 moves upwardly it engages the serrated edge 126 of a weighted pivotal arm 127. The top of the bag 72 is normally provided with a thumb cut-out 128 as illustrated in FIG. 16. As a result, the serrated end 126 of arm 127 engages the rear-most top edge of the bag 72 only when the bag rises.

As the bag continues to rise, the top edge of the rear wall thereof moves upwardly to the nip defined by a driven roller 129 and a pivotal bag spreading plate 130. The roller 129 drives the top edge of the rearmost wall of the bag 72 into a gripping engagement with retainer 131 at the top of plate 130.

The top edge of the front wall of the bag 72 which has been spread from the top edge of the rear wall thereof by means of the serrated end 126 of the arm 125, intrudes into the nip of a second pivotal bag opening plate 132 which is also provided with a gripping retainer 133 similar to gripping retainer 131.

The top of plate 132 is mounted to an articulated arm 134 attached at its opposite end to the actuating rod 135 of a pneumatic cylinder 136.

When the gripper 117 on arm 113 moves to a position most distal from the stack 104 as illustrated in broken lines in FIG. 15, it engages a limit switch 137. It should be noted that a pin 138 on gripper 117 (shown in FIG. 16) engages arm 121 when arm 113 has pivoted partially through the opening cycle thereby moving arm 121 to a clear position as shown in broken lines in FIG. 15.

When limit switch 137 is actuated, pneumatic cylinder 136 is energized to pivot the articulated arm 134 moving the bag spreading plate 132 to a position more nearly parallel to plate 130 thereby opening the top of the bag 72 as shown in broken lines in FIG. 15.

Figure 5:
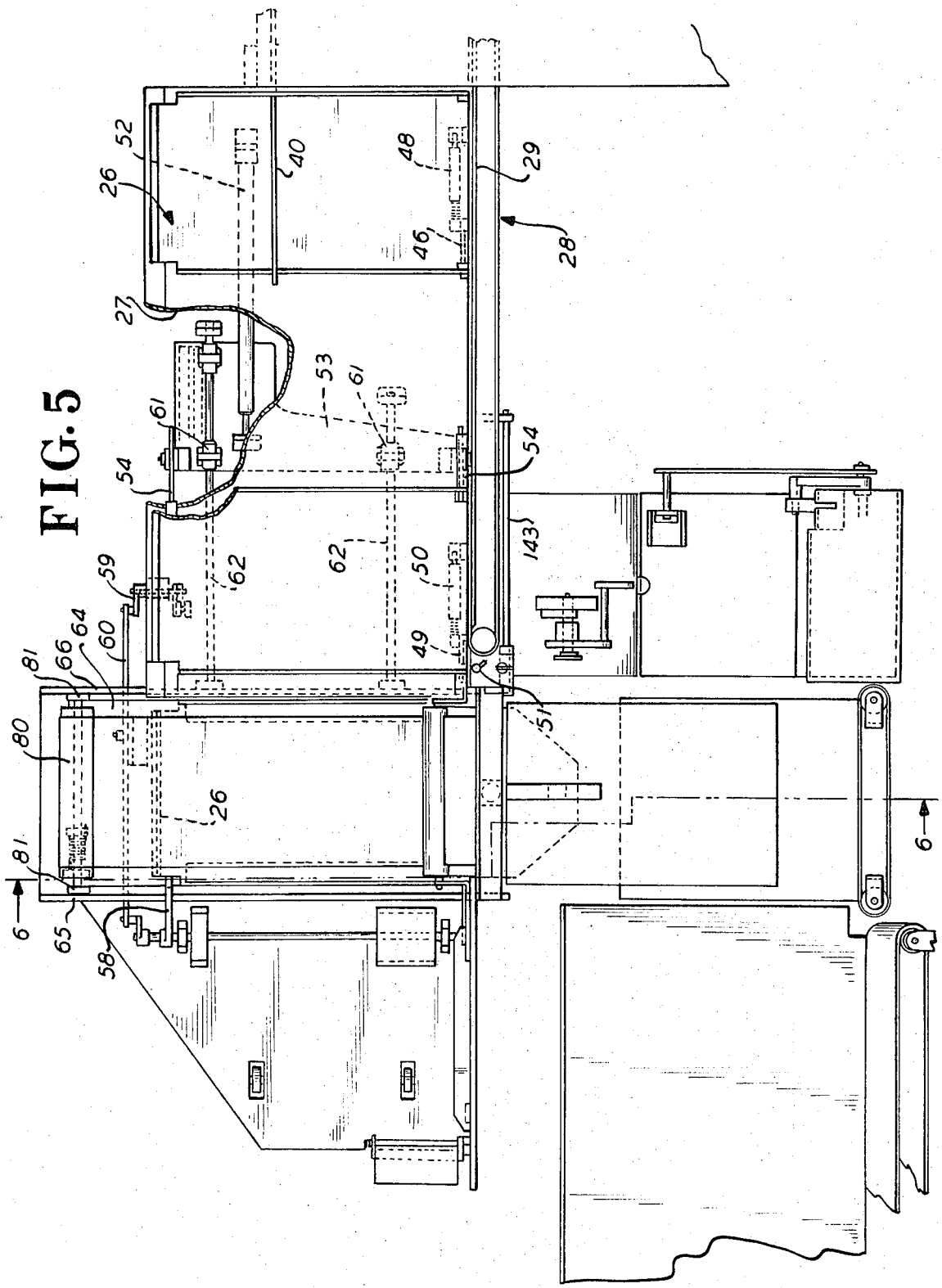
FIG. 5 is an oblique plan view of a portion of the apparatus normal to the plane of the cassette support wall and showing the cassette transport and bag loading assemblies.

Once the bag 72 has been opened as shown in broken lines in FIG. 15, it is necessary to transport the open bag from the opening position or station shown in FIG. 5 to the bag loading station immediately adjacent thereto. This is accomplished by moving the plates 130 and 132 along guide rods 143, 143 shown in FIG. 16. Plates 130 and 132 are pivotably mounted on shafts 138 and 139.

Shafts 138, 139 are mounted on a carrier 140 supporting the pneumatic cylinder 136. The carrier 140 is connected to a pneumatic cylinder 141 through connecting rod 142. Pneumatic cylinder 141 drives the carrier 140 along guide rods 143, 143 which are displaced rearwardly of the downward projection of the bag loading assembly 63.

As a consequence, the opened bag with plates 130–132 intruded therewithin and supported by grippers 131-133 is moved to the loading station beneath the bag loading assembly 63.

Once the contents of cassette 26 have been emptied into the bag at the loading station, the cassette must be removed therefrom to provide space for the next ensuing cassette. Additionally, each cassette in turn must be returned to the front of conveyor 28 for reuse. The cassette circulating assembly is illustrated in detail in FIGS. 7 and 8.

Referring in detail to FIG. 7 and FIG. 17, when a cassette 26 has been emptied in the bag loading station, the next ensuing cassette 26 forces the now empty cassette 26 out of the bag loading station.

The leading side wall 33 of cassette 26 is provided with a guide notch 144 which engages a rail 145 downstream from the bag loading station. Rail 145 guides the leading side wall 33 of the cassette 26 around a bend causing the rear wall 32 to move rearwardly. However, the opposite side wall 34 of the cassette 26 is not provided with a notch thereby riding within or to the rear of rail 145.

When the leading wall 33 of cassette 26 disengages the terminal end of rail 145, it engages an arcuate frictional surface or bumper 146 which is attached to an articulated pivotal arm 147 which is spring-loaded. As the cassette 26 engages bumper 146, the arm 147 pivots slightly under impact permitting the opposite side wall 34 of the cassette 26 to pass rearwardly around an idler roller 148. It should be borne in mind that the entire mechanism shown in FIG. 7 is articulated at an angle of approximately 45° to the vertical so that gravity forces the cassette 26 downwardly toward the bottom of the view in FIG. 7.

When the cassette 26 clears roller 148 it drops onto common idler wheels 149, 149 from whence it engages a return conveyor 150. Contact pressure with the upper course of conveyor 150, of course, is by gravity. The cassettes 26 travel on conveyor 150 to the leading end of the apparatus illustrated in FIG. 8.

Conveyor 150 is energized in response to energization of conveyor 28 running for substantially the same period of time. As a consequence, cassettes are carried on conveyor 150 to its terminal end from whence it engages a stop 151 secured to a pivotal frame 152. Pivotal frame 152 is normally generally parallel to the conveyor 28 in which position stop 151 is adapted to engage the leading edge of the cassette 26 as it approaches the leading edge of frame 152. When limit switch 153 senses the presence of no cassette on the conveyor 28 in the feed position, frame 152 pivots to lie parallel to the longitudinal axis of return conveyor 150. Conveyor 150 then drives three cassettes 26, 26, 26 toward the leading end of conveyor 28 where they engage a second stop 154.

Two limit switches 155, 156 are provided in association with frame 152 to engage the rear wall of cassettes 26, 26, 26 between stops 151 and 154. When limit switches 155 and 156 are simultaneously closed, it indicates the presence of three cassettes between stops 154 and 151. At this time, a pneumatic cylinder 157 is energized driving a connecting rod 158 which is in turn connected to frame 152. This pivots the frame 152 to a position parallel to conveyor 28 carrying with it the three cassettes now positioned against frame 152. The three cassettes are now deposited on the top course 29 of conveyor 28 for movement therewith. A bottom plate 159 is provided intermediate the bottom of the frame 152 and the edge of conveyor 28 to support the bottoms of the cassettes when they pass the last of idler rollers 149.

A motor 160 is provided as drive for conveyor 150 and a second motor 161 as a drive for conveyor 28.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention.

I claim:

1. An automatic merchandise tally and bagging apparatus comprising:
   a. a counter;
   b. a cassette-loading station contiguous to the counter;
   c. a rear support wall on the cassette-loading station inclined at an angle from the vertical;
   d. conveyor means extending along the rear support wall;
   e. a cassette in the cassette loading station, the cassette having a rear wall and a pair of opposed, spaced-apart side walls the cassette being open at the front and bottom and adapted to receive merchandise, the rear wall of the cassette being supported by said inclined support wall and the said conveyor means,
   f. a reciprocating bag loading assembly at the end of the conveyor means opposite the bag loading station,
   g. means for moving cassettes from the conveyor means into the bag loading assembly,
   h. retractable support means on the bag loading assembly beneath the cassette as it enters the bag loading assembly,
   i. means for reciprocating the bag loading apparatus downwardly into an open bag therebeneath and upwardly from said bag,
   j. means for retracting the said support means from beneath the merchandise in the cassette when the bag loading assembly is proximal to the bottom of the bag and returning the said retractable support means to a position beneath the next ensuing cassette to enter the bag loading assembly.

2. An automatic merchandise tally and bagging apparatus comprising,
   a. the structure in accordance with claim 1 and b. means for cycling cassettes from the bag loading assembly to the cassette loading station.

3. An automatic merchandise tally and bagging apparatus comprising:
   a. the structure in accordance with claim 1 and,
   b. generally horizontal merchandise conveyor means extending generally from the cassette loading station in a direction opposite from the bag loading assembly.

4. An automatic merchandise tally and bagging apparatus comprising,
   a. the structure in accordance with claim 1 in which,
   b. the counter extends generally at right angles to the direction of movement of the said conveyor means extending along the rear support wall and
   c. register means on the said counter.

5. An automatic merchandise tally and bagging apparatus comprising,
   a. the structure in accordance with claim 1 in which,
   b. the opposed side walls of the cassette are each provided with a slot, the slots being in opposed registration with each other, and
   c. a shelf removably seated in said slots extending across the cassette.

6. An automatic merchandise tally and bagging apparatus comprising,
   a. the structure in accordance with claim 1 and
   b. means for opening a bag and positioning it beneath the bag loading assembly.

7. An automatic merchandise tally and bagging apparatus comprising,
   a. the structure in accordance with claim 6 and
   b. means for cycling cassettes from the bag loading assembly to the cassette loading station.

8. An automatic merchandise tally and bagging apparatus comprising,
   a. the structure in accordance with claim 7 and
   b. generally horizontal merchandise conveyor means extending generally from the cassette loading station in a direction opposite from the bag loading assembly.

9. An automatic merchandise tally and bagging apparatus comprising,
   a. the structure in accordance with claim 8 in which,
   b. the counter extends generally at right angles to the direction of movement of the said conveyor means extending along the rear support wall and
   c. register means on the said counter.

10. An automatic merchandise tally and bagging apparatus comprising,
    a. the structure in accordance with claim 1 in which,
    b. the bag loading assembly reciprocates in a plane generally parallel to the plane of the said rear support wall.

11. An automatic merchandise tally and bagging apparatus comprising,
    a. the structure in accordance with claim 1 in which,
    b. the said rear support wall is inclined at an angle of approximately 30° to 60° to the vertical.

12. An automatic merchandise tally and bagging apparatus comprising,
    a. the structure in accordance with claim 1 in which,
    b. the bag loading assembly consists of a rear support wall lying generally in the plane of the cassette-supporting course of the conveyor means extending along the said rear support wall continuous to the end thereof,
    c. engagable and disengagable cooperative means on each cassette and the bag loading assembly to secure the cassette and bag-loading assembly against movement with respect to each other in the direction of reciprocation of the bag loading assembly,
    d. a floor at the bottom of the bag loading assembly, the floor adapted to engage the bottom of a cassette as it moves into the bag loading assembly
    e. means for reciprocating the floor to and from beneath the bag loading assembly in timed relationship to the reciprocation of the bag loading assembly.
    f. a flexible curtain detachably engaged to the rear support wall of the bag loading assembly extending beneath the curtain extending across the bottom of the cassette in the bag loading assembly and supporting merchandise therein when the floor is reciprocated from beneath the bag loading assembly the curtain defining the retractable support means,
    g. means for retaining the curtain from said rear support wall in timed relationship to the reciprocation of the bag loading assembly,
    h. means for attaching the said curtain to the said rear support wall in timed relationship of the bag loading assembly.

13. An automatic merchandise tally and bagging apparatus comprising,
    a. the structure in accordance with claim 12 and
    b. means for retracting the curtain away from the said rear support wall of the bag loading assembly when released therefrom.

14. An automatic merchandise tally and bagging apparatus comprising,
    a. the structure in accordance with claim 13 in which,
    b. the curtain is detached from the said rear support wall generally at the lowermost point of reciprocation of the bag loading assembly.

15. An automatic merchandise tally and bagging apparatus comprising,
    a. the structure in accordance with claim 14 in which,
    b. the said means for retracting the curtain is a torsionally loaded roller to which the curtain is attached.

16. An automatic merchandise tally and bagging apparatus comprising,
    a. the structure in accordance with claim 15 in which
    b. the said torsionally loaded roller is mounted on the bag loading assembly, and
    c. at least one stationary roller
    d. at least one roller mounted beneath the said floor for movement therewith,
    e. the curtain extending from the torsionally loaded roller, around the stationary roller and between the bottom of the floor and the roller mounted therebeneath.

17. An automatic merchandise tally and bagging apparatus comprising,
    a. the structure in accordance with claim 16 and
    b. a rigid end plate on the end of the curtain attachable to the said rear support wall, the width of the plate being greater than the minimum distance between the bottom of the floor and the roller mounted therebeneath,
    c. fastener means on said end plate cooperatively engageable to fastener means on the rear support wall of the bag loading assembly, d. the torsionally loaded roller retracting the curtain until the said end plate is trapped between the bottom of the floor and the roller therebeneath, the end plate thereby assuming a position generally perpendicular to the said rear wall, e. the said end plate on the curtain moving toward the said rear support wall until the said cooperative fasteners engage as the floor reciprocates to a position beneath the bag loading assembly.

18. An automatic merchandise tally and bagging apparatus comprising, a. the structure in accordance with claim 12 and b. a plate pivotally mounted to the bag loading assembly at the top thereof spaced away from but generally parallel to the rear support wall thereof, the plate extending downwardly in front of a cassette in the bag loading assembly.

19. An automatic merchandise tally and bagging apparatus comprising, a. the structure in accordance with claim 1 in which b. the said conveyor means extending along the rear support wall are driven, c. means for energizing the said conveyor means for a predetermined period of time, d. stop means engagable and disengagable with cassettes carried by the conveyor means into the loading station, said stop means holding each cassette in turn at the loading station irrespective of continued movement of the conveyor means, e. the said stop means disengaging the cassette at the loading station each time the said conveyor means are energized.

20. A method for tallying and automatically bagging merchandise comprising:

a. stacking articles in container means open at the front and bottom in generally vertical tiers, the heavier articles lying beneath the lighter articles, the rear wall of the container means being inclined from the vertical, b. moving the said tiers of articles latitudinally while at said inclined angle to a bag loading station;

c. reciprocating the contained merchandise generally downwardly into an open bag while simultaneously supporting the merchandise from beneath, and d. removing the said support from the merchandise proximal to the bottom of the bag and withdrawing the empty container upwardly from the bag.

21. A method for tallying and automatically bagging merchandise comprising, a. the procedure in accordance with claim 20 and b. cycling empty containers from the bag loading station to container loading station.

* * * * *